United States Patent
Li

(10) Patent No.: US 11,977,171 B2
(45) Date of Patent: May 7, 2024

(54) POSITION, NAVIGATION AND TIMING SYSTEM ARCHITECTURE BASED ON SIGNALS OF OPPORTUNITY

(71) Applicant: The Boeing Company, Chicago, IL (US)

(72) Inventor: Rongsheng Li, Corona, CA (US)

(73) Assignee: The Boeing Company, Arlington, VA (US)

( * ) Notice: Subject to any disclaimer, the term of this patent is extended or adjusted under 35 U.S.C. 154(b) by 362 days.

(21) Appl. No.: 17/471,873

(22) Filed: Sep. 10, 2021

(65) Prior Publication Data

US 2022/0196851 A1 Jun. 23, 2022

Related U.S. Application Data

(60) Provisional application No. 63/127,403, filed on Dec. 18, 2020.

(51) Int. Cl.
  *G01S 19/47* (2010.01)
  *G01S 19/07* (2010.01)
  *G01S 19/25* (2010.01)

(52) U.S. Cl.
  CPC .......... *G01S 19/47* (2013.01); *G01S 19/072* (2019.08); *G01S 19/252* (2013.01)

(58) Field of Classification Search
  CPC ...... G01S 19/47; G01S 19/072; G01S 19/252; G01S 19/00; G01S 5/021; G01S 5/0242;
  (Continued)

(56) References Cited

U.S. PATENT DOCUMENTS 6,674,398 B2 * 1/2004 Murphy .................. G01S 19/38
              342/456
9,304,184 B1 4/2016 Dragonov et al.
(Continued)

FOREIGN PATENT DOCUMENTS

EP 3751305 A2 12/2020
EP 3751305 A 3/2021

OTHER PUBLICATIONS

Extended European Search Report (EESR) dated Apr. 13, 2022, in European Patent Application No. 21207768.9 (European counterpart of the instant U.S. patent application).

*Primary Examiner* — Anne Marie Antonucci
*Assistant Examiner* — Patrick Daniel Mohl
(74) *Attorney, Agent, or Firm* — Ostrager Chong Flaherty & Broitman P.C.

(57) ABSTRACT

Systems and methods for inertial navigation aided by signals of opportunity (SOOP). One system includes a network operations center (NOC), a reference station, and mobile user equipment. Another system includes a NOC and user equipment without a reference station. In the latter system, the NOC comprises an antenna, a NOC receiver that generates SOOP data derived from SOOP, a computer system that generates SOOP source location/ephemeris data and inter-source clock bias data based on SOOP data generated by the NOC receiver, and a communication device to broadcast the data. The user equipment comprises an antenna, a navigation receiver that generates SOOP data derived from SOOP detected by the antenna of the user equipment, and a navigation computer system that calculates a navigation solution, including a SOOP-derived estimated position of the user equipment, based on SOOP source location/ephemeris data and inter-source clock bias data (Continued)

broadcasted by the NOC and SOOP data generated by the navigation receiver.

24 Claims, 10 Drawing Sheets

(58) Field of Classification Search
CPC ........ G01S 5/0246; G01S 5/0258; G01S 5/10; G01C 21/20; G06F 16/2455; H04W 4/024; H04W 64/006
See application file for complete search history.

(56) References Cited

U.S. PATENT DOCUMENTS

| | | |
|---|---|---|
| 9,739,891 B2 | 8/2017 | Kennedy et al. |
| 9,846,240 B2 | 12/2017 | Li et al. |
| 10,694,148 B1 | 6/2020 | Li et al. |
| 10,993,121 B1 | 4/2021 | Li et al. |
| 2009/0121940 A1* | 5/2009 | Ladd .................. G01S 5/10 342/463 |
| 2012/0182180 A1* | 7/2012 | Wolf .................. G01S 5/145 342/357.29 |
| 2015/0133152 A1* | 5/2015 | Edge .................. G01S 5/0036 455/456.1 |
| 2016/0109551 A1* | 4/2016 | Faragher ............ G01S 19/48 701/500 |
| 2017/0295463 A1* | 10/2017 | Lindquist ............ H04W 4/023 |
| 2018/0067187 A1* | 3/2018 | Oh .................. H04W 64/00 |
| 2018/0167779 A1* | 6/2018 | Wirola ............... H04W 64/003 |
| 2019/0293806 A1* | 9/2019 | Haley ................ H04W 4/02 |
| 2020/0025942 A1 | 1/2020 | Kassas et al. |
| 2022/0196851 A1* | 6/2022 | Li .................... G01S 19/252 |
| 2023/0048916 A1* | 2/2023 | Flynn ................. G01S 5/0009 |
| 2023/0308130 A1* | 9/2023 | Raghupathy ........... G01S 19/11 |

* cited by examiner

POSITION, NAVIGATION AND TIMING SYSTEM ARCHITECTURE BASED ON SIGNALS OF OPPORTUNITY

RELATED PATENT APPLICATION

This application claims the benefit, under Title 35, United States Code, Section 119(e), of U.S. Provisional Application No. 63/127,403 filed on Dec. 18, 2020.

BACKGROUND

The present disclosure generally relates to position, navigation and timing (PNT) systems and, in particular, relates to PNT systems which are based on signals of opportunity. As used herein, the term "signals of opportunity" refers to radio-frequency (RF) signals that are not originally designed for navigation, such as television or radio broadcast signals and cellular network signals. Also, the terms "location" and "position" are used interchangeably as synonyms which may be represented by geographic coordinates in a frame of reference.

Global positioning systems (GPS) and global navigation satellite systems (GNSS) are more widely used than are other navigation systems such as vision-based navigation, terrain-referenced navigation, and gravity anomaly-referenced navigation systems. However, GPS and GNSS signals are more susceptible to external interference as compared to gravity anomaly-referenced navigation systems. Specifically, GPS and other GNSS signals are low in power, thereby making them susceptible to disruption by even very low power interferences. For example, GPS denial may be caused by interference referred to as "jamming".

In many navigation systems, GPS is integrated with an inertial navigation system (INS) such that the long-term stability of a GPS navigation solution complements the short-term accuracy of an INS. However, if GPS becomes unavailable, the INS errors will increase over time. As a result, various solutions have been proposed which rely on a combination of different types of sensors integrated into a navigation system that may be used as an alternative or a supplemental solution when the GPS system is unavailable (among many other "complementary" or "alternative" positioning, navigation and tracking (PNT) approaches such as vision-based navigation, celestial navigation, terrain-referenced navigation, signals-of-opportunity-based PNT, etc.)

A PNT system based on signals of opportunity (hereinafter "SOOP") is capable of calculating the position of a receiver by using various available RF signals transmitted by infrastructure or systems that are already in place. SOOP are ambient radio signals not originally designed to serve as PNT sources, such as cellular, Wi-Fi, AM/FM, digital television, Iridium satellites, etc. By employing a wide range of signals, SOOP is resistant to interference such as jamming and spoofing. A SOOP-based PNT system may learn from signals that are initially unidentified to construct a database that enables a receiver location fix that may increase in accuracy and reliability over time, or more precisely, performance, availability, and integrity. A SOOP-based PNT system may be integrated into existing personal navigation devices to provide superior performance in a GPS-denied environment.

SUMMARY

The subject matter disclosed in some detail below is directed to a system architecture to provide SOOP-based PNT services in a GPS-denied environment. A SOOP-based PNT system is proposed that includes user equipment carried by users (a person or a vehicle), one or more network operations centers (NOCs), and one or more reference stations. Each user equipment, network operations center, and reference station includes a respective SOOP receiver (which are referred to hereinafter by the names "navigation receiver", "NOC receiver", and "reference receiver", respectively). As used herein, the term "SOOP receiver" means a receiver that is capable of receiving signals from various sources of SOOP (hereinafter "SOOP sources").

In accordance with one embodiment, the network operations center may be as simple and small as a suitcase equipped with a SOOP receiver, a GNSS receiver, a precision clock, and communication equipment. The network operations center is typically located at a precisely known position and is configured to provide users with information about the SOOP sources, such as ephemeris, inter-source clock bias, health, ionosphere and troposphere error model parameters, etc. at a very low rate (such as once every hour). The reference station may also be a suitcase of equipment located at a precisely known position. The reference station is configured to measure the signal time of arrival (TOA) frequently (such as once every few seconds). The respective roles of reference station and network operations center may be played by the same equipment.

The architecture proposed herein includes an operation planning and support system to plan and support performance, availability and integrity. The reference stations are used to solve the synchronization problem between multiple signal sources. In addition, time difference of arrival (TDOA) can be used to determine the position (geolocation) of RF-emitting signal sources and time. Using three or more receivers, TDOA algorithms can be used to locate a signal source from the different arrival times at the receivers. The system proposed herein further includes the use of "good clock", "relative clock bias modeling", and ionosphere and troposphere propagation delay modeling to reduce dependency on reference stations. The signal diversity and strong signal power of SOOP assures availability and integrity. The system architecture further includes crowd-based ephemeris determination.

In accordance with the basic strategy adopted herein, when reference stations are available, relative clock biases are estimated between asynchronous signal sources, the signals from which are parametrically modeled. (As used herein, the term "clock error" includes clock bias and noise. By solving the SOOP equations, the system is able to estimate the clock bias, but not the noise.) When reference stations are not available, times of arrival (TOA) from different sources are corrected against a single source using the relative clock biases. PNT solutions are derived from TOA from the "mathematically synchronized" sources (after the correction) in a manner similar to GNSS. Because TOA and TDOA measurements can be viewed as pseudorange and pseudorange difference measurements, any method for computing position based on pseudorange and pseudorange difference measurements can be applied in the cases of TOA and TDOA Although various embodiments of SOOP-based PNT systems will be described in some detail below, one or more of those embodiments may be characterized by one or more of the following aspects.

One aspect of the subject matter disclosed in detail below is a system for navigation using signals of opportunity (SOOP), the system comprising a network operations center and user equipment which are capable of communicating with each other, wherein: the network operations center comprises a first antenna, a network operations center receiver (NOC receiver) connected and configured to generate SOOP data derived from SOOP detected by the its antenna, a computer system configured to generate SOOP source location/ephemeris data and inter-source clock bias data based on SOOP data generated by the NOC receiver, and a communication device that is capable of broadcasting data to the user equipment; and the user equipment comprises a its own antenna, a navigation receiver connected and configured to generate SOOP data derived from SOOP detected by its antenna, and a navigation computer system configured to calculate a navigation solution, including a SOOP-derived estimated position of the user equipment, based on SOOP source location/ephemeris data and inter-source clock bias data broadcasted by the network operations center and SOOP data generated by the navigation receiver.

In accordance with various embodiments, the system described in the immediately preceding paragraph may include one or more of the following features. The SOOP data generated by the NOC receiver comprises times of arrival (TOA) of SOOP from SOOP sources. The computer system of the network operations center is further configured to process SOOP source location/ephemeris data received from third parties. The computer system of the network operations center is further configured to estimate and model SOOP source location/ephemeris data, inter-source clock bias data, and ionosphere and troposphere delays using data received from a crowd of users. In accordance with one proposed implementation, the SOOP data generated by the navigation receiver comprises times of arrival, the inter-source clock bias data comprises inter-source clock bias estimates, and the navigation computer system comprises a time-of-arrival correction module which is configured to correct the times of arrival using the inter-source clock bias estimates.

In accordance with some embodiments, the user equipment further comprises an inertial measurement unit configured to generate acceleration data and rotational rate data representing a measured acceleration and the rotational rate of the user equipment. In addition, the navigation solution calculated by the navigation computer system is also based on the acceleration data and rotational rate generated by the inertial measurement unit updated by times of arrival corrected by inter-source clock biases. In accordance with other embodiments the navigation computer system is further configured to generate a model-based estimated position using a kinematics- or dynamics-based propagation model and then use the SOOP-derived estimated position to correct the model-based estimated position.

Another aspect of the subject matter disclosed in detail below is a method for operating user equipment to navigate using signals of opportunity (SOOP), the method comprising: (a) receiving location/ephemeris data and inter-source clock bias data for SOOP sources from a network operations center; (b) receiving SOOP from SOOP sources at a navigation receiver of the user equipment; (c) converting the SOOP into SOOP data; and (d) calculating a navigation solution, including a SOOP-derived estimated position of the user equipment, based on SOOP source location/ephemeris data and inter-source clock bias data broadcasted by the network operations center and SOOP data generated by the navigation receiver.

A further aspect of the subject matter disclosed in detail below is a system for navigation using signals of opportunity (SOOP), the system comprising: a network operations center configured to generate SOOP source location/ephemeris data; a reference receiver configured to generate SOOP data derived from SOOP received at the reference receiver; and user equipment configured to receive and process data received from the network operations center and data received from the reference receiver. The user equipment comprises: a navigation receiver configured to receive a signal of opportunity and generate SOOP data derived from the signal of opportunity; and a navigation computer system configured to calculate a navigation solution, including an estimated position of the user equipment, based on at least signals of opportunity transmitted by SOOP sources and received by the navigation and reference receivers and SOOP source location/ephemeris data transmitted by the network operations center. In one proposed application, the system is a vehicle, further comprising a guidance and control system communicatively coupled to the inertial navigation system and configured to control the vehicle in accordance with the updated navigation solution.

In accordance with some embodiments, the SOOP data is in-phase and quadrature (I/Q) data and the navigation computer system comprises a cross-correlator configured to correlate I/Q data received from the navigation receiver with I/Q data received from the reference receiver. In accordance with other embodiments, the SOOP data is time of arrival (TOA) data and the navigation computer system comprises a difference calculation module configured to calculate the measured TDOA based on a difference between a first TOA of a signal of opportunity at the navigation receiver and a second TOA of the signal of opportunity at the reference receiver.

A further aspect of the subject matter disclosed in detail below is a network operations center comprising an antenna, a network operations center receiver (NOC receiver) connected and configured to generate SOOP data derived from SOOP detected by the antenna, a computer system configured to generate SOOP source location/ephemeris data and inter-source clock bias data based on SOOP data generated by the NOC receiver, and a communication device that is capable of broadcasting data. The computer system may be further configured to process SOOP source location/ephemeris data received from third parties. In addition, the computer system may be further configured to estimate and model SOOP source location/ephemeris data, inter-source clock bias data, and ionosphere and troposphere delays using data received from a crowd of users.

Yet another aspect is user equipment comprising: an antenna; a SOOP source ephemeris database configured to store SOOP source location/ephemeris data and inter-source clock bias data; a navigation receiver connected and configured to generate SOOP data derived from SOOP detected by the antenna; and a navigation computer system configured to calculate a navigation solution, including a SOOP-derived estimated position of the user equipment, based on SOOP source location/ephemeris data and inter-source clock bias data retrieved from the SOOP source ephemeris database and SOOP data generated by the navigation receiver.

A further aspect of the subject matter disclosed in detail below is a system for inertial navigation aided by SOOP, the system comprising: a network operations center configured to generate SOOP source location/ephemeris data and inter-source clock bias data; a reference receiver configured to generate SOOP data derived from SOOP received at the reference receiver; and user equipment configured to receive and process data received from the network operations center and data received from the reference receiver, wherein the user equipment comprises: an inertial measurement unit configured to generate acceleration and rotation rate data representing measured acceleration and rotation rate of the user equipment; a navigation receiver configured to receive a signal of opportunity and generate SOOP data derived from the signal of opportunity; and a navigation computer system configured to calculate a navigation solution, including an estimated position of the user equipment, based on at least data acquired by the inertial measurement unit, and then calculate a navigation state correction based on at least signals of opportunity transmitted by SOOP sources and received by the navigation and reference receivers and SOOP source location/ephemeris data and inter-source clock bias data transmitted by the network operations center.

Another aspect of the subject matter disclosed in detail below is a system for inertial navigation aided by signals of opportunity (SOOP), the system comprising a network operations center configured to generate SOOP source location/ephemeris data and inter-source clock bias data and user equipment configured to receive and process data received from the network operations center, wherein the user equipment comprises: an inertial measurement unit configured to generate acceleration and rotation rate data representing measured acceleration and rotation rate of the user equipment; an inertial navigation module configured to calculate a navigation solution, including an estimated position of the user equipment, based on at least data acquired by the inertial measurement unit; a navigation receiver configured to receive a signal of opportunity from a SOOP source and generate SOOP data derived from the signal of opportunity; a SOOP source ephemeris database configured to store SOOP source location/ephemeris data and inter-source clock bias data received from a network operations center; a TDOA prediction module communicatively coupled to receive the navigation solution from the inertial navigation module and to receive SOOP source location/ephemeris data and inter-source clock bias data from the SOOP source ephemeris database, wherein the TDOA prediction module is configured to calculate a predicted TDOA using a location of the SOOP source, a location of a reference receiver, the estimated position of the user equipment, and an inter-source clock bias; a TDOA processing module configured to calculate a measured TDOA based on at least first SOOP data output by the navigation receiver and second SOOP data output by the reference receiver, which first and second SOOP data represents a signal of opportunity transmitted by a SOOP source and respectively received by the navigation and reference receivers; a residual and sensitivity-matrix calculation module communicatively coupled to receive the predicted and measured TDOAs and configured to calculate a residual representing a difference between the predicted TDOA and the measured TDOA; and a Kalman filter connected to receive the residual from the residual and sensitivity-matrix calculation module and to send a navigation state correction to the inertial navigation module and configured to calculate the navigation state correction based on at least the residual.

A further aspect of the subject matter disclosed in detail below is a method for operating user equipment to perform inertial navigation aided by SOOP, the method comprising: (a) calculating a navigation solution based on at least data acquired by an inertial measurement unit of the user equipment, wherein the navigation solution includes an estimated position of the user equipment with a first time-tag; (b) converting a signal of opportunity from a SOOP source received at a navigation receiver of the user equipment into first SOOP data representing the signal of opportunity or a feature of the signal of opportunity; (c) receiving location/ephemeris data and inter-source clock bias data for the SOOP source from a network operations center; (d) receiving second SOOP data representing the signal of opportunity or the feature of the signal of opportunity which was received at a reference receiver having a location; (e) calculating a navigation state correction based on at least a location of the SOOP source, the location of the reference receiver, the navigation solution, the inter-source clock bias data, and the first and second SOOP data; and (f) calculating an updated navigation solution for the user equipment based in part on the navigation state correction, wherein the updated navigation solution includes an updated estimated position of the user equipment with a second time-tag. In accordance with one embodiment, step (e) comprises: calculating a predicted TDOA using the location of the SOOP source, the location of the reference receiver, the navigation solution, and the inter-source clock bias; calculating a measured TDOA based on at least first and second SOOP data; and calculating a residual representing a difference between the predicted TDOA and the measured TDOA.

Yet another aspect of the subject matter disclosed in detail below is a system for inertial navigation aided by SOOP, the system comprising a network operations center configured to generate SOOP source location/ephemeris data and inter-source clock bias data and user equipment configured to receive and process data received from the network operations center, wherein the user equipment comprises: an inertial measurement unit configured to generate acceleration and rotation rate data representing a measured acceleration and rotation rate of the user equipment; an inertial navigation module configured to calculate a navigation solution, including an estimated position of the user equipment, based on at least data acquired by the inertial measurement unit; a navigation receiver configured to receive a signal of opportunity and generate SOOP data derived from the signal of opportunity; a SOOP source ephemeris database configured to store SOOP source location/ephemeris data and inter-source clock bias data generated by the network operations center; a TOA prediction module communicatively coupled to receive the navigation solution from the inertial navigation module and receive SOOP source location/ephemeris data and inter-source clock bias data from the SOOP source ephemeris database, wherein the TOA prediction module is configured to calculate a predicted TOA using a location of a SOOP source, the estimated position of the user equipment, and the inter-source clock bias; a TOA processing module configured to calculate a measured TOA based on at least SOOP data output by the navigation receiver, which SOOP data represents a signal of opportunity transmitted by a SOOP source; a residual and sensitivity-matrix calculation module communicatively coupled to receive the predicted and measured TOAs and configured to calculate a residual representing a difference between the predicted TOA and the measured TOA; and a Kalman filter connected to receive the residual from the residual and sensitivity-matrix calculation module and to send a navigation state correction to the inertial navigation module and configured to calculate the navigation state correction based on at least the residual.

Other aspects of SOOP-based PNT systems are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
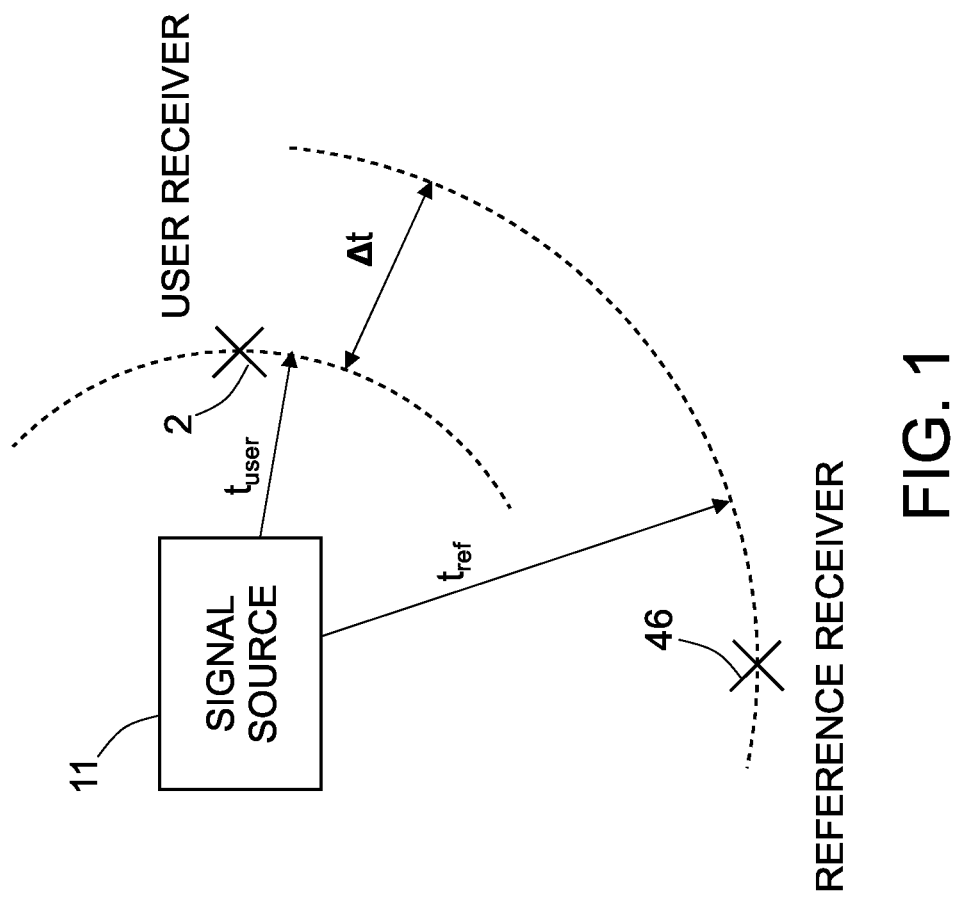
FIG. 1 is a diagram showing the basic concept of how a time difference of arrival is measured when a signal source broadcasts the same signal to a mobile user receiver and a fixed reference receiver.

Illustrative embodiments of SOOP-based PNT systems are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many advantages provided by using SOOP for navigation. A multitude of SOOP signals are available to low cross-checking/integrity monitoring to enable signal diversity. SOOP have high power signal and are able to difficult to jam. No additional infrastructure needs to be installed in order to transmit the signals. Also, advances in radio technology enable the construction of a radio that receives and processes signals from many different sources.

However, designing a system that uses SOOP for navigation is not without challenges. SOOP are not optimized for navigation. Also, the availability of SOOP varies in accordance with location. Augmentation may be needed. In addition, in order to use the time of arrival of signals to determine position, the transmission time must be known. However, most communication systems are not time-synchronized with sufficient precision in order to enable navigation without a reference station. The communication backchannel between a user and a reference station is vulnerable.

In accordance with an alternative technique for navigating in a GPS-denied environment, beacon-based navigation (including pseudolites) may be used. A pseudolite is a transceiver (not onboard a satellite) that transmits signals which are similar to GPS signals. Pseudolite signals and SOOP are not incompatible.

In accordance with one embodiment of a SOOP-based PNT system, reference stations are used to solve the synchronization problem between multiple signal sources. The system architecture proposed herein includes a use planning and operation support system (referred to hereinafter as "network operations center") to plan and support performance, availability and integrity in the network. In accordance with various embodiments, the network planning and operation support may include one or more of the following aspects: (a) predict expected performance and vulnerability based on signal availability; (b) plan augmentations if necessary; (c) plan reference stations; (d) plan ephemeris refinement using "crowd data" collected SOOP users; (e) threat monitoring and distribution; and (f) ephemeris update and distribution. In accordance with some embodiments, the system architecture further includes reference stations which are deployed according to the plan. Location and configuration of reference stations may be changed in real-time.

In accordance with one proposed implementation of the SOOP-based PNT system proposed herein, the user equipment includes broad-band receivers for diversity of signals and a highly integrated single-chip software-defined radio. The user equipment receives SOOP from each of several signal sources while communicating with a reference receiver. The SOOP are also received by the reference receiver. A backchannel communication link (e.g., a wireless link) between the user and reference receivers enables the user receiver (referred to hereinafter as "navigation receiver") to determine a difference (TDOA) between the respective times of arrival. The reference receiver is used to determine the effect of the signal source clock error. Crowd data feedback is used to support ephemeris update. The inclusion of reference stations enables the PNT system to process SOOP from asynchronous signal sources. Using a reference station also enables raw in-phase/quadrature-based TDOA by correlation.

In accordance with a further aspect of the system architecture proposed herein, the dependency on reference stations may be reduced. More specifically, the frequency of reference station usage may be reduced using a chip-scale atomic clock incorporated in the user equipment for time synchronization or by modeling signal source clock errors. For example, the signal processor of the user equipment may be configured to apply ionosphere and troposphere propagation delay modeling in cases wherein the SOOP are being transmitted from satellites. Differential correction may be applied by using a model of the propagation error sources similar to what has been done for differential-GPS. Also, signal sources may be used which have a data pattern that can be used as time-marks (such as a message header). This will also reduce the need for communication bandwidth.

In accordance with the embodiments disclosed in some detail below, both the mobile user equipment and the reference station include a respective SOOP receiver that is capable of receiving RF signals from various SOOP sources. The SOOP receiver uses time difference of arrival (TDOA) measurements to determine the position (geolocation) of the SOOP sources.

FIG. 1 is a diagram showing the basic concept of how TDOA is measured when a signal source 11 broadcasts the same signal to a mobile user receiver 2 and a reference receiver 46. The time for the signal to propagate from signal source 11 to user receiver 2 is denoted $t_{user}$, while the time for the signal to propagate from signal source 11 to reference receiver 46 is denoted time $t_{ref}$. Then the TDOA may be calculated using the equation $\Delta t = t_{ref} - t_{user}$.

The user and reference receivers may employ either of two types of TDOA measurement. One method for measuring TDOA is to cross-correlate samples from reference receiver 46 with samples from user receiver 2. The time offset corresponding to the peak of the cross-correlation is the TDOA measurement. Another method for measuring TDOA is to separately detect signal features in each receiver and then share only the time at which those features were detected. For example, the reference receiver 46 may determine the start time of a pulse sequence and send that start time to the user receiver 2 through a backchannel communications link. The user receiver 2 also measures the start time of the same pulse sequence and then calculates the differences between the respective start times to form the TDOA measurement.

Figure 2:
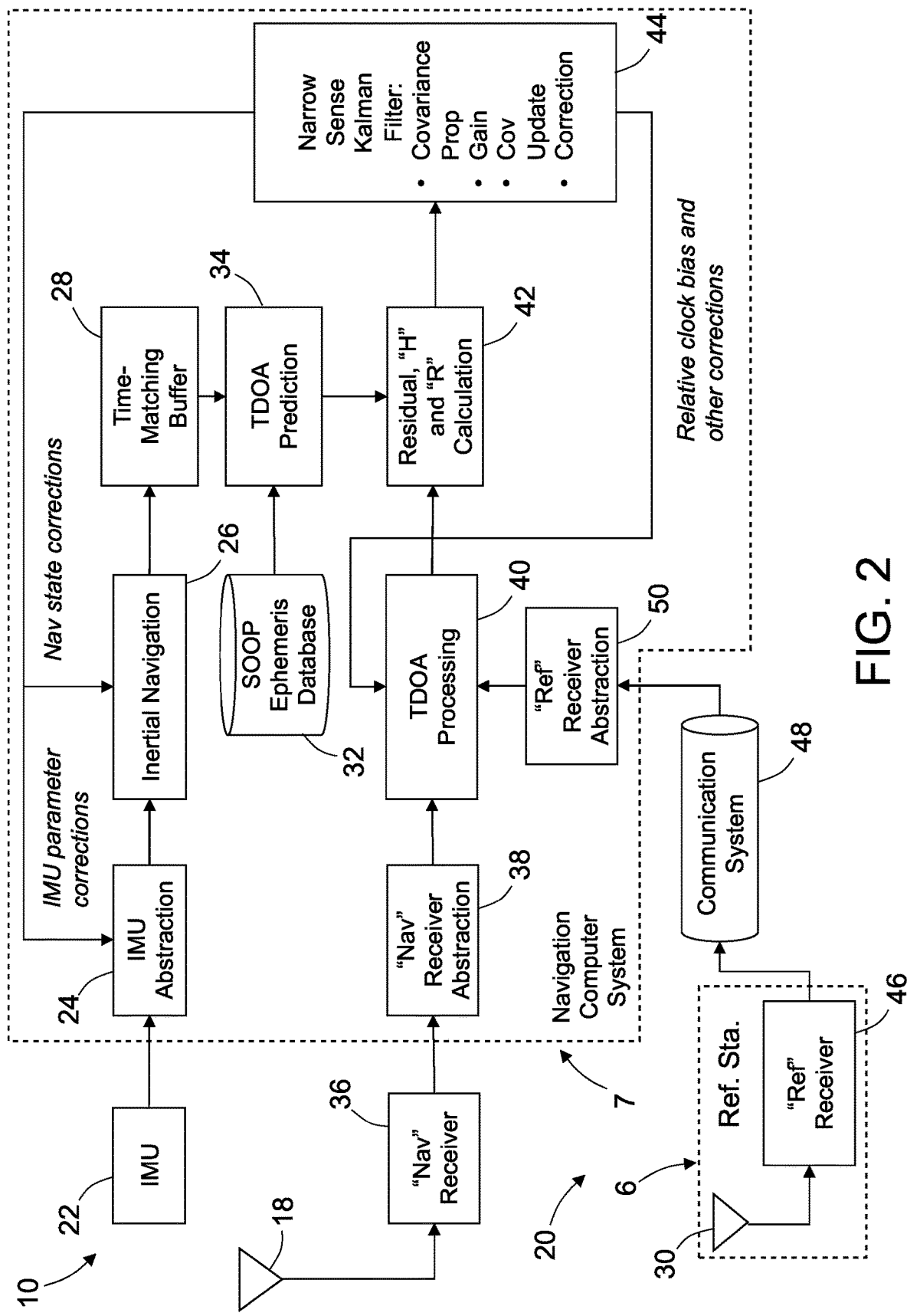
FIG. 2 is a diagram identifying components of a navigation system in which mobile user equipment uses a SOOP-based navigation technique that depends on information from a reference station to augment inertial navigation.

FIG. 2 is a diagram identifying components of a navigation system 20 in which user equipment 10 uses a SOOP-based navigation technique that depends on information from a reference station 6 to augment inertial navigation in accordance with an exemplary embodiment. In the example depicted in FIG. 2, the navigation system 20 includes user equipment 10 which is mobile and a reference station 6 which is fixed. Both user equipment 10 and reference station 6 receive SOOP from signal sources (not shown in FIG. 2) within detection range. The user equipment 10 includes a navigation computer system 7 that is configured to determine a position of the user equipment 10 in a frame of reference of Earth, such as the ECEF frame of reference. The navigation computer system 7 receives SOOP information from a reference receiver 46 of reference station 6 via a communication system 48 (a.k.a. backchannel communication link).

In accordance with the embodiment depicted in FIG. 2, the user equipment 10 includes an inertial measurement unit 22 (hereinafter "IMU 22"), an antenna 18, a navigation receiver 36 (e.g., a software-defined radio) which receives signals from antenna 18, and the navigation computer system 7. The reference station 6 includes an antenna 30 and a reference receiver 46 which receives signals from antenna 30. The navigation computer system 7 receives data from IMU 22, navigation receiver 36, and reference receiver 46 and then processes that data to determine the position of user equipment 10.

More specifically, the navigation computer system 7 is in electronic communication with the IMU 22 by way of an IMU interface (not shown in FIG. 1) and is in electronic communication with the navigation receiver 36 by way of a navigation receiver interface (not shown). The navigation computer system 7 includes various modules which are configured to provide the below-described functionalities. Each module may include one or more processors programmed to execute instructions in accordance with respective software programs.

In the example depicted in FIG. 2, the navigation computer system 7 includes an IMU abstraction module 24 connected to the IMU 22 (via an IMU interface) and an inertial navigation module 26 connected to the IMU abstraction module 24. The inertial navigation module 26 implements the inertial navigation by integrating the IMU output using standard strap-down inertial navigation equations. More specifically, the inertial navigation module 26 generates a "propagation solution" which is subject to correction as described below. The navigation computer system 7 also includes a time-matching buffer 28 which is connected to receive the propagation solution from the inertial navigation module 26 and store the propagation solution in a circular buffer.

The IMU 22 includes a first plurality of sensors for measuring the acceleration (e.g., three accelerometers having non-coplanar axes) and a second plurality of sensors for measuring the rotation rate (e.g., three gyroscopes having mutually orthogonal axes) of the user equipment 10. The IMU abstraction module 24 processes and encodes the signals output by the sensors of IMU 22 to form digital data representing measurements of the rotation rate (or delta angle) and acceleration (or delta velocity) of user equipment 10. That rotation and acceleration data is processed by the inertial navigation module 26.

The IMU interface (not shown in FIG. 2) is a combination of electrical hardware and software interfaces which enable the IMU data output by the IMU 22 to be provided to the navigation compute system 7. The IMU abstraction module 24 is a piece of software that transforms the IMU type/vendor-specific data into abstract, generic IMU data and interfaces. This module allows the inertial navigation module 26 to remain unchanged even if a different type of IMU is installed.

The inertial navigation module 26 is software that implements the classical "strapdown inertial navigation equations" (widely known in the art) which integrate the gyro data (rotation rate or delta angle) into attitude and transforms the accelerometer data (specific source or delta velocity) into a reference frame such as ECI, ECEF or local level frame. The transformed acceleration is then integrated into velocity and then integrated into position. In one proposed implementation, the inertial navigation module 26 includes executable code to integrate the rotation rate of user equipment 10 into the attitude of the user equipment 10 with consideration of the Earth's rotation. The user equipment attitude is then used to project user equipment acceleration onto the ECEF frame of reference. Accordingly, total user equipment acceleration, including gravity, due to Earth rotation can be calculated. User equipment acceleration is then integrated into velocity and user equipment velocity is integrated to determine the position of the user equipment 10 in the ECEF frame of reference.

The time-matching buffer 28 stores a short history of the navigation states, including the attitude, velocity, position and possibly other relevant variables. Upon giving a time-tag a measurement, the corresponding state estimate will be calculated based on the data available in the buffer through interpolation. The time-matching buffer 28 includes executable code to store the position, velocity, attitude of user equipment 10 into a first-in first-out buffer or a circular buffer with a time tag. The time-matching buffer 28 provides the time-matched position, velocity, and attitude of user equipment 10 when a time tag of the SOOP-based measurements is provided. The time-matched position, velocity and attitude of the user equipment 10 constitute the delayed propagation solution.

The delayed propagation solution is output to a TDOA prediction module 34. The TDOA prediction module 34 also retrieves source location/ephemeris information for the SOOP sources from a SOOP source ephemeris database 32. The TDOA prediction module 34 predicts the TDOA measurement using the SOOP source location (known or computed from the source location/ephemeris information) and the current estimate of the user equipment position (retrieved from the time-matching buffer 28). The predicted TDOA is for the instant in time the measured TDOA is valid for.

The navigation computer system 7 also includes a navigation receiver abstraction module 38 connected to receive (via a navigation receiver interface not shown) measured TOA and FOA or I/Q data output from the navigation receiver 36 and send the measured TOA and FOA or I/Q data to a TDOA processing module 40. In addition, the navigation computer system 7 includes a reference receiver abstraction module 50 connected to receive (via a reference receiver interface not shown) measured TOA and FOA or I/Q data output from the reference receiver 46 and send the measured TOA and FOA or I/Q data to the TDOA processing module 40. The TDOA processing module 40 is configured to generate TDOA data based on the data received from navigation receiver 36 and reference receiver 46 and the current estimate of the relative clock bias between navigation receiver 36 and reference receiver 46 calculated by a narrow-sense Kalman filter 44 (hereinafter "Kalman filter 44").

The navigation computer system 7 further includes a residual and sensitivity-matrix calculation module 42 communicatively coupled to receive the TDOA data generated by TDOA processing module 40 and the predicted TDOA data generated by the TDOA prediction module 34. The residual and sensitivity-matrix calculation module 42 compares the predicted TDOA data against the measured TDOA data to calculate a Kalman filter residual. The Kalman filter 44 is connected to receive calculated residuals and matrices from residual and sensitivity-matrix calculation module 42. The Kalman filter 44 implements the known art of Kalman filter equations and calculates IMU parameter corrections (which are sent to IMU abstraction module 24), navigation state corrections (which are sent to inertial navigation module 26), and the relative clock bias between the reference receiver 46 and the navigation receiver 36 and other corrections (which are sent to the TDOA processing module 40).

The residual r represents the difference between the predicted TDOA and the measured TDOA. The residual and sensitivity-matrix calculation module 42 also calculates a sensitivity matrix (H-matrix) and a measurement noise covariance matrix (R-matrix). The H-matrix is a matrix that maps a state to a measurement in a linearized error equation that indicates how error in the navigation solution and states in the Kalman filter 44 affect the predicted TDOA. The R-matrix indicates a level of uncertainty or variances of the measurements collected by the accelerometers.

Any one of multiple TDOA positioning algorithms may be used. The distance between the reference station 6 and the SOOP source is subtracted from the TDOA measurement after converting units from time to distance based on the speed of light. The result is the distance between the navigation receiver 36 and the SOOP source plus the differential clock error, which is the same for simultaneous TDOA measurements. In order to solve for a two-dimensional position, at least three TDOA measurements (derived from three SOOP sources) are needed.

The Kalman filter 44 is configured to calculate position, velocity and attitude corrections based on the received residuals and matrices. The Kalman filter 44 maintains the covariance matrix of the states. The Kalman filter 44 also uses the H- and R-matrices to compute the gain, uses the gain residual to calculate corrections, and uses the gain matrix, the R-matrix, and the current covariance matrix to calculate the covariance matrix after update. In addition, the Kalman filter 44 estimates IMU corrections, such as bias, scale factor, misalignment corrections, which are sent to and applied by the IMU abstraction module 24. The Kalman filter-estimated position, velocity and attitude errors are sent to and applied by the inertial navigation module 26 to calculate a navigation solution, including the SOOP-corrected position of the user equipment.

In summary, the navigation system depicted in FIG. 2 enables SOOP-aided navigation correction capability. Concurrently with operation of the SOOP-aided navigation correction capability, the IMU 22 generates a time sequence of inertial navigation information (hereinafter "IMU data"). An inertial navigation algorithm (performed in inertial navigation module 26) is configured to analyze the IMU data to produce a time sequence of estimated inertial navigation solutions representing changing locations of the user equipment. That navigation solution is computed based in part on corrections derived by comparing the TDOA measured by the SOOP-based navigation system to the TDOA predicted by the inertial navigation system. The respective data from the inertial navigation system and the SOOP-based navigation system are fused by the Kalman filter 44. The resulting navigation solution thus takes into account the corrections.

The modules of navigation computer system 7 may include one or more devices selected from microprocessors, microcontrollers, digital signal processors, microcomputers, central processing units, application-specific integrated circuits, field-programmable gate arrays, programmable logic devices, state machines, logic circuits, analog circuits, and digital circuits. In the case of computer devices under software control, the computer device executes operational instructions that are stored in a non-transitory tangible computer-readable storage medium. In accordance with one embodiment, the navigation computer system 7 includes software modules that have code executable by respective processors for carrying out the functions and processes, as described herein.

The TDOA processing module 40 may be configured to generate TDOA data based on the data received from navigation receiver 36 and reference receiver 46 using either or two methods. These methods will be described with reference to FIGS. 3 and 4.

Figure 3:
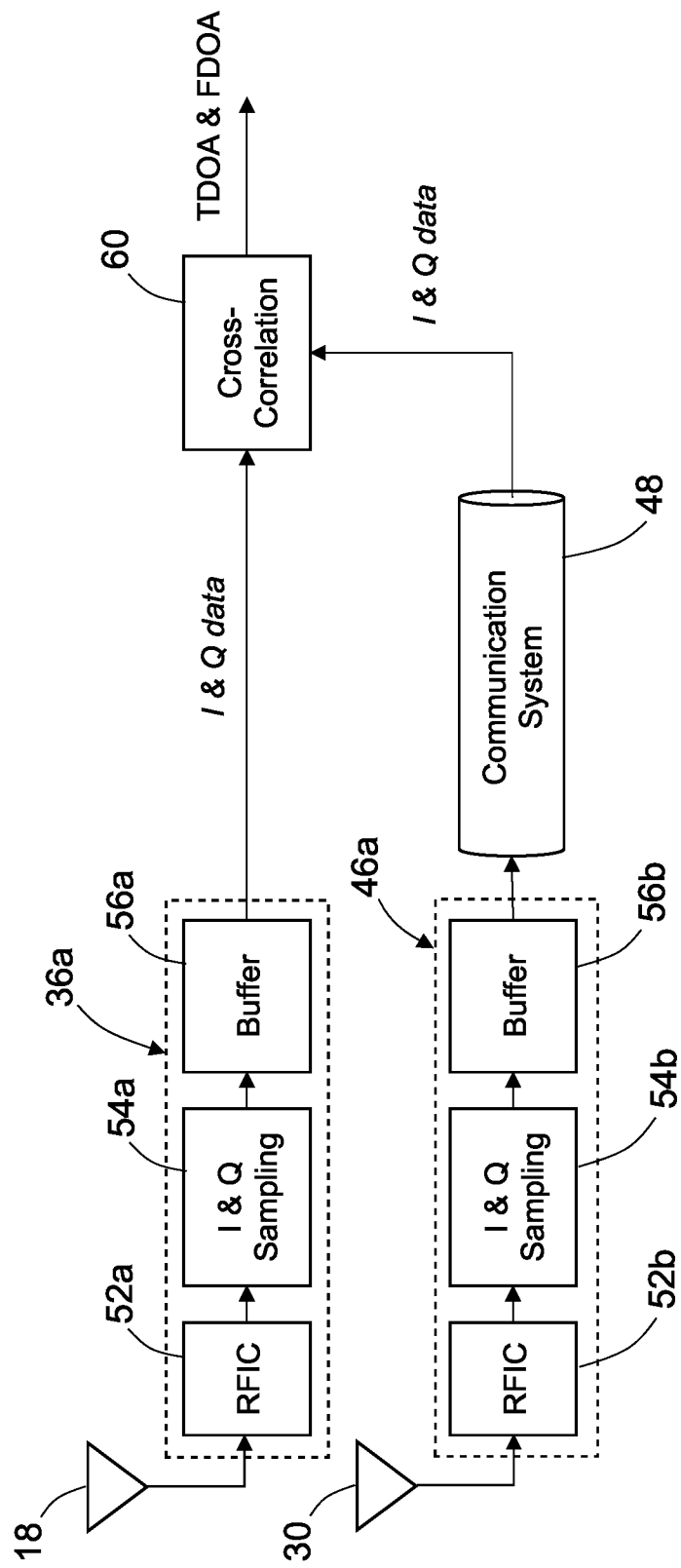
FIG. 3 is a diagram representing a process for generating TDOA and FDOA measurements using cross-correlation between samples from a reference receiver at a reference station and samples from a navigation receiver incorporated in mobile user equipment, which samples were derived from the same signal transmitted by a signal source.

FIG. 3 is a diagram representing a process for generating TDOA and FDOA measurements using cross-correlation between samples from a reference receiver 46a at a reference station and samples from a navigation receiver 36a incorporated in mobile user equipment. The samples are derived from the same SOOP transmitted by a signal source. The navigation receiver 36a is connected to the output of antenna 18. More specifically, the navigation receiver 36a includes: a radio-frequency integrated circuit 52a (hereinafter "RFIC 52a") which receives a continuous (analog) bandpass signal from antenna 18; an in-phase and quadrature sampling module 54a (hereinafter "I/Q sampling module 54a") that digitizes the bandpass signal and translates its spectrum to be centered at 0 Hz to generate I/Q data; and a buffer 56a which outputs the I/Q data with delay to a cross-correlator 60. The navigation receiver 36a and cross-correlator 60 are parts of the navigation system of the user equipment.

Similarly, the reference receiver 46a includes: a RFIC 52b which receives a bandpass signal from antenna 30; an I/Q sampling module 54b that digitizes the bandpass signal and translates its spectrum to be centered at 0 Hz to generate I/Q data; and a buffer 56b which outputs the I/Q data with delay to the cross-correlator 60 by way of a communication system 48. The cross-correlator 60 is configured to cross-correlate the I/Q data from reference receiver 46a with the I/Q data from navigation receiver 36a and output TDOA and FDOA measurements. The time offset corresponding to the peak of the cross-correlation is the TDOA measurement.

Figure 4:
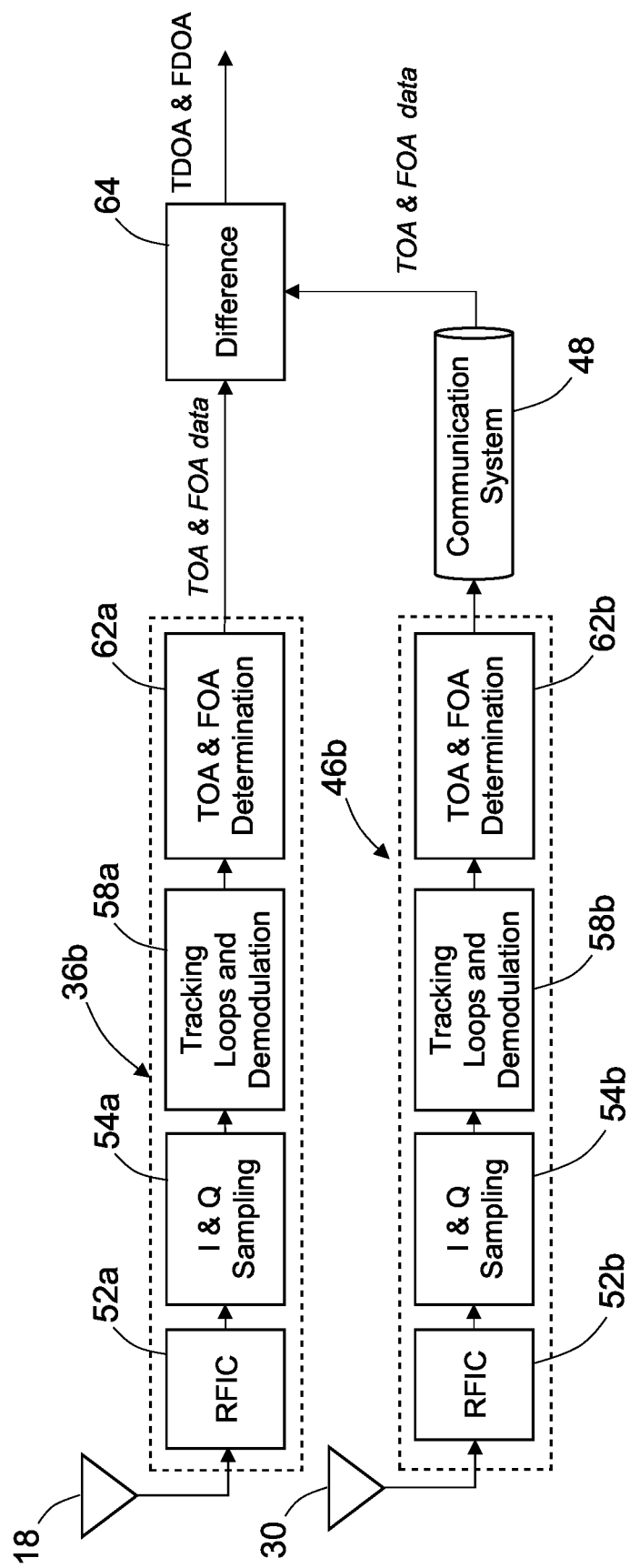
FIG. 4 is a diagram representing a process for generating TDOA and FDOA measurements by calculating the differences in TOA and FOA for signals detected by a reference receiver at a reference station and signals detected by a navigation receiver incorporated in mobile user equipment.

FIG. 4 is a diagram representing a process for generating TDOA and FDOA measurements by calculating the differences in TOA and FOA for signals detected by a reference receiver 46b at a reference station and signals detected by a navigation receiver 36b incorporated in mobile user equipment. Again the samples are derived from the same SOOP transmitted by a signal source. The navigation receiver 36b is connected to the output of antenna 18. More specifically, the navigation receiver 36b includes: RFIC 52b which receives a bandpass signal from antenna 18; an I/Q sampling module 54b that generates I/Q data; a tracking and demodulation module 58a which is configured to track and demodulate the I/Q data to extract signal features; and a TOA and FOA determination module 62a which is configured to determine TOA and FOA and output the TOA and FOA data to a difference calculation module 64. The navigation receiver 36b and difference calculation module 64 are parts of the navigation system of the user equipment.

Similarly, the reference receiver 46b includes: a RFIC 52b which receives a bandpass signal from antenna 30; an I/Q sampling module 54b that generates I/Q data; a tracking and demodulation module 58b which is configured to track and demodulate the I/Q data to extract signal features; and a TOA and FOA determination module 62b which is configured to determine TOA and FOA and output the TOA and FOA data to the difference calculation module 64 by way of the communication system 48. The difference calculation module 64 is configured to calculate the difference between the TOA from reference receiver 46b and the TOA from navigation receiver 36b and output the TDOA measurement. The difference calculation module 64 is also configured to calculate the difference between the FOA from reference receiver 46b and the FOA from navigation receiver 36b and output the FDOA measurement.

In accordance with one embodiment, each tracking and demodulation module includes tracking loops which extract information to synchronize the incoming signal with a locally generated signal, and a data demodulation and processing block configured to extract useful information to be used by the applications processing block when generating a navigation solution. The inputs to the data demodulation and processing block are the measurements from the tracking loops (code and carrier information).

The user equipment may operate in one of two ways to use SOOP to provide a navigation solution for the user. When reference stations are available, relative clock biases are estimated between asynchronous signal sources. When reference stations are not available, times of arrival (TOA) from different sources are corrected against a single source using the relative (inter-source) clock biases broadcasted by the network operations center.

In accordance with a first embodiment, the user equipment communicates via respective backchannel links with a network operations center and a reference station. The navigation receiver of the user equipment is capable of receiving signals from different SOOP sources and generating TOA measurements. The reference receiver will receive signals from the same SOOP sources and generate TOA measurements which the reference receiver will send to the user equipment. The network operations center (which includes a receiver configured to receive and process SOOP) will generate SOOP source ephemeris information and send that information to the user equipment. The user equipment will then use the three pieces of information to determine its position and relative clock bias with respect to the reference station.

Figure 5:
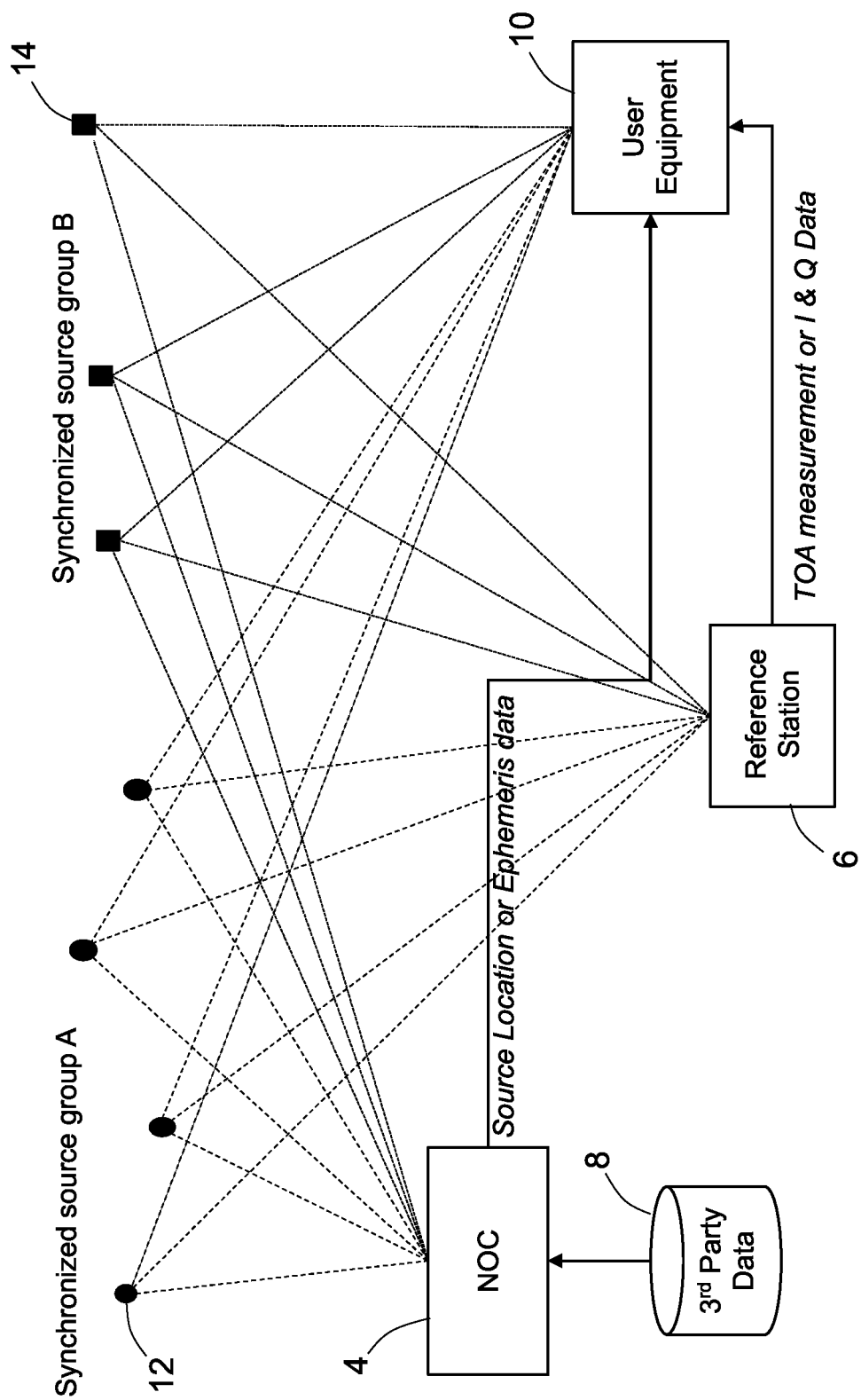
FIG. 5 is a diagram representing architecture for a system in which mobile user equipment uses a SOOP-based navigation technique that depends on information from a network operations center and information from a reference station to augment inertial navigation.

FIG. 5 is a diagram representing architecture for a system in which user equipment 10 uses a SOOP-based navigation technique that depends on information from a network operations center 4 (hereinafter "NOC 4") and information from a reference station 6 to augment inertial navigation. The NOC 4, reference station 6, and user equipment 10 each include a respective receiver for receiving SOOP from different signal sources. The NOC 4 also receives third-party data 8 from other systems. As used herein, the term "third party" means an entity which is equipped to provide accurate location/ephemeris data. For example, the third party could be the owner/operator of a satellite system such as XM/Sirius Radio or Iridium Communication.

In the example depicted in FIG. 5, the SOOP sources include a first plurality of synchronized signal sources 12 (Group A) and a second plurality of synchronized signal sources 14 (Group B). The signal sources 12 are synchronized within Group A (e.g., the Iridium Constellation). The signal sources 14 are synchronized within Group B (e.g., Sirius XM radio satellites). The NOC 4 tracks these sources as well as receives third-party data 8 from other systems to determine source location or ephemeris information for the sources. The NOC 4 sends the source location or ephemeris information to the user equipment 10. The reference station 6 generates TOA or I/Q data for signals from all of the sources and sends the TOA or I/Q data to the user equipment 10. The user equipment 10 receives the source location/ephemeris data from NOC 4 and the TOA or I/Q data from reference station 6. The user equipment 10 is configured to first determine the TDOA by differencing the TOAs or by cross-correlating the I/Q data and then determine its position and the clock bias with respect to the reference station 6.

Figure 10:
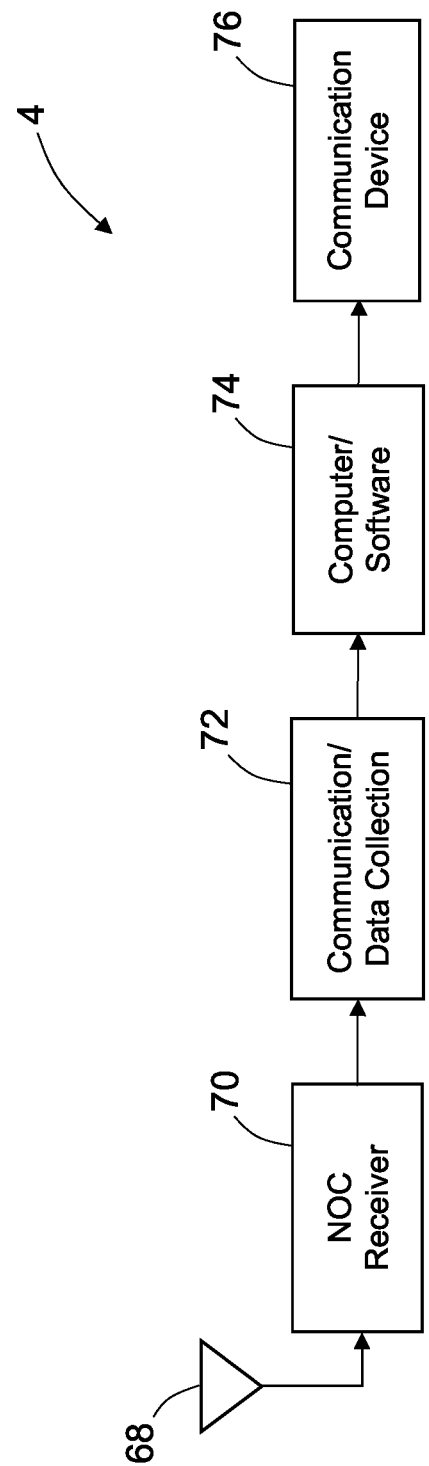
FIG. 10 is a block diagram identifying major systems of a network operations center in accordance with one embodiment.

The NOC 4 may be as simple and small as a suitcase equipped with a SOOP receiver (e.g., NOC receiver 70 seen in FIG. 10), a GNSS receiver, a precision clock, a computer system (e.g., computer system 74 seen in FIG. 10), and communication equipment (e.g., communication device 76 seen in FIG. 10). The NOC 4 is located at a precisely known position. In accordance with one proposed implementation, the NOC 4 is configured to provide users with information about the SOOP sources, such as source location/ephemeris, inter-source clock biases, and ionosphere and troposphere error model parameters, at a very low rate (such as once every hour).

The reference station 6 may also be a suitcase of equipment located at a precisely known position. The reference station 6 is configured to measure the signal time of arrival (TOA) frequently (such as once every few seconds). The respective roles of reference station and network operations center may be played by the same equipment.

In accordance with one proposed implementation, the NOC collects SOOP source location/ephemeris data using crowd sourcing. As used herein, the term "crowd" means a multiplicity of users having user equipment capable of generating accurate SOOP TOA measurement together with independent time and position information for the user. This typically only happens when GPS/GNSS is available for the user at the same time. For example, each GPS-equipped user equipment may send TOA data to the NOC 4 so that the NOC 4 can use the mass amount of TOA data, together with time and location data of each of the users, to determine orbits or to determine clock errors and ionosphere and troposphere delays.

Given a signal source, the position of the moving source may be determined using a source ephemeris model, such as a model expressed by the following position and velocity differential equation:

$$\frac{d}{dt}\begin{bmatrix} R \\ V \\ p \end{bmatrix} = \begin{bmatrix} 0 & I & 0 \\ 0 & 0 & 0 \\ 0 & 0 & 0 \end{bmatrix}\begin{bmatrix} R \\ V \\ p \end{bmatrix} + \begin{bmatrix} 0 \\ f(R, p) \\ 0 \end{bmatrix}$$

where R is the position vector of the source (such as a spacecraft), V is its velocity, p is a parameter vector that models various disturbance forces. If the user location is known (e.g., because GNSS is available) the TOA measurement received from each of the users can be modeled as $$T_{TOA,k} = T_{TOT} + b_j + \frac{\|R_k - R_j\|}{c} + \delta t_{prop} + v$$

where $T_{TOA,k}$ is the time at which the "time-mark" is received by the SOOP receiver of the k-th user; $T_{TOT}$ is the time at which the "time-mark" was transmitted by a source j (hereinafter "j-th source") with unknown source clock bias $b_j$; $R_k$ is the known location of the k-th user; $R_j$ is the known location of the j-th source as predicted using known data or satellite ephemeris; $\delta t_{prop}$ is the propagation delay due to ionosphere and troposphere delays; c is the speed of light; and v is receiver noise. This equation can be treated as the measurement equation for the unknown source position vector R.

Provided that an equation like the one in the immediately preceding paragraph is available for each user, the NOC computer can process the many user measurements in the following ways: (1) with four or more users distributed at different geographical locations, the NOC computer can solve for a least squares problem to calculate a position vector R; and (2) the system designer may also construct a Kalman filter using the state propagation model or anything similar and using the measurement equations set forth above. The result is that one can use crowd-sourced SOOP data to determine or refine source location or source ephemeris parameters.

In accordance with a second embodiment, the user equipment 10 communicates via a backchannel link with NOC 4 and does not use information from a reference station. Again the navigation receiver 36 (see FIG. 2) of the user equipment 10 is capable of receiving signals from different SOOP sources and generating TOA measurements. The NOC 4 will generate SOOP source location/ephemeris information and send that information to the user equipment. The message constructed and sent by the NOC 4 also includes high-accuracy relative clock bias estimates between different SOOP sources (for example, the relative clock bias between Iridium and Global Star satellite systems or between Iridium and Sirius XM radio satellite systems). In addition, ionosphere and troposphere error model parameters representing navigation signal propagation delays may also be included in the message. The user equipment 10 will then use the information in the message to determine the position of user equipment 10 and solve for the clock bias between the user equipment 10 and the common time reference for the different SOOPs (the reference used by the NOC 4 to determine clock biases of all signal sources).

Figure 6:
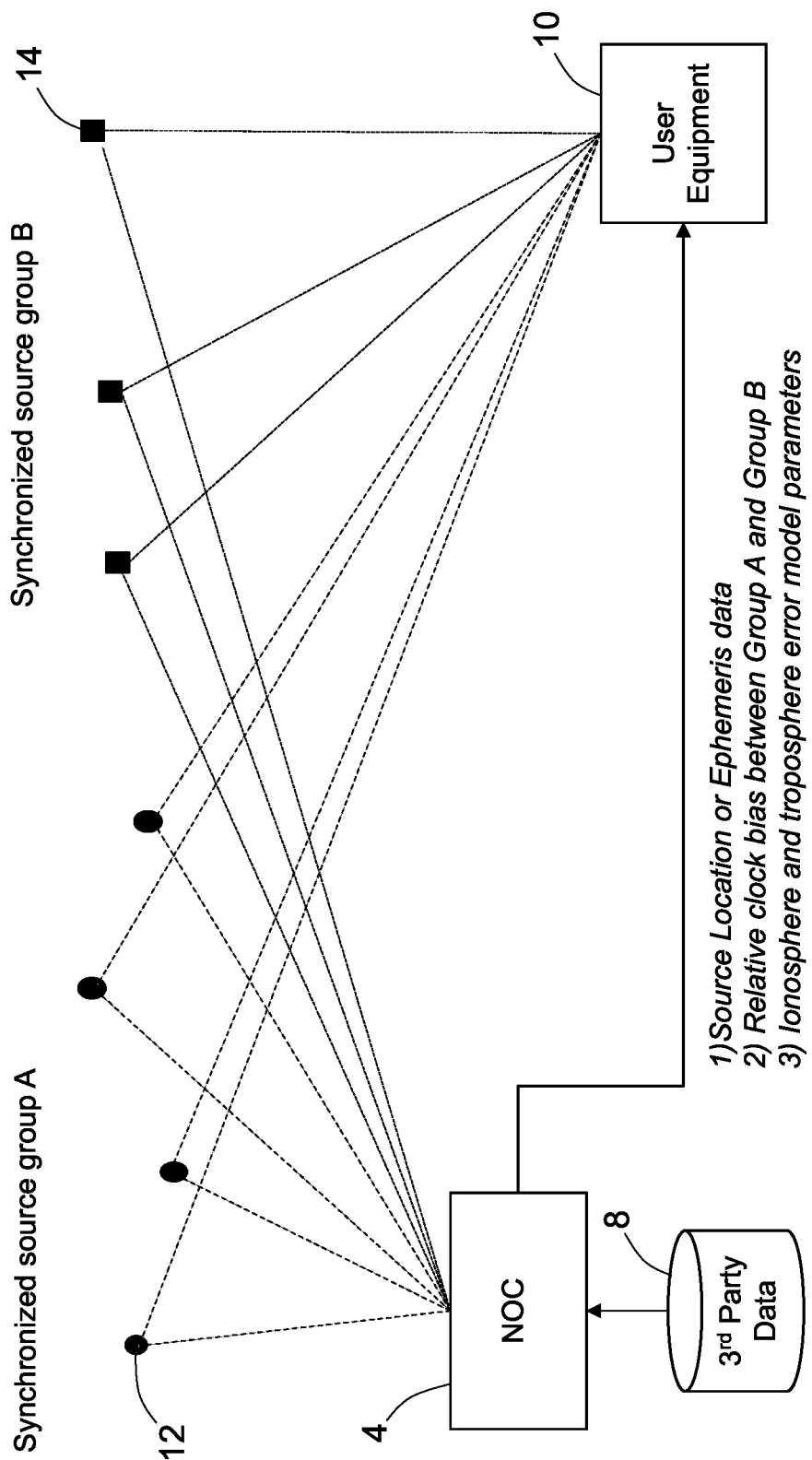
FIG. 6 is a diagram representing architecture for a system in which mobile user equipment uses a SOOP-based navigation technique that depends on information from a network operations center to augment inertial navigation.

FIG. 6 is a diagram representing architecture for a system in which user equipment 10 employs a SOOP-based navigation technique that depends on information from NOC 4 to augment inertial navigation and does not depend on information from a reference station. The signal sources 12 and 14 were described above with reference to FIG. 5. The NOC 4 and user equipment 10 each include a respective receiver configured for receiving and processing SOOP from different signal sources. The NOC 4 tracks these sources as well as receives third-party data 8 from other systems to determine source location or ephemeris information for the sources. The NOC 4 also uses its own location and known source locations to try to determine the relative clock bias between the different synchronized groups. The user equipment 10 receives the source location/ephemeris data from the NOC 4 and uses the relative clock bias (also referred to herein as "inter-source clock bias") between the groups to correct the TOA measurements and then solve the PNT problem in the same way as a traditional GPS receiver does.

The NOC computer is configured to determine (estimate) inter-source or inter-constellation clock bias. As previously described, the NOC 4 is equipped with SOOP receivers that receive signals from different SOOP sources. For example, an NOC may be able to receive signals from satellites in the Iridium constellation, Global Star constellation, XM/Sirius Radio, Space Link, and terrestrial sources such as FM radio stations.

The multiple sources making up a single constellation are typically internally synchronized with each other and use the same time reference. But the different constellations are owned by different commercial entities and typically there is no mechanism to ensure that the constellations are synchronized with each other. The lack of synchronicity gives rise to the inter-constellation clock bias referred to hereinabove.

As previously described with reference to FIGS. 2-5, the standard practice is to use SOOP receivers respectively incorporated in reference stations and in user equipment to measure TOAs of the same signal at two different places (the user and the reference station) and use the differencing process to cancel out the contribution of the individual clock biases of each constellation. However, the use of reference stations imposes a significant burden on the total system in terms of frequent (such as once every few seconds) and vulnerable communications required to support the operation.

The innovation proposed herein is to avoid using reference stations by instead estimating the relative clock errors between the different constellations and by distributing such results to users at a much lower rate of communication (such as once every 6 hours instead of once every few seconds). More specifically, the following steps are used to achieve advantageous results: (1) Data representing the known location of NOC 4 is stored in a non-transitory tangible computer-readable storage medium. (2) A high-precision clock that is synchronized with GPS or other "absolute time reference" is installed at the NOC 4. (3) The NOC computer is configured to process signals from SOOP sources that contain periodic patterns which may be used as time-marks (such periodic patterns are typically found in the message headers of the various SOOP signals). (4) The NOC computer is further configured to retrieve or compute SOOP source location data (either a fixed source location on Earth or the location of a spacecraft predicted using absolute time and spacecraft ephemeris data). Using the foregoing information, the TOA of a message received by NOC SOOP receiver $T_{TOA}$ can be expressed by the following equations for a particular signal source j:

$$T_{TOA} = T_{TOT} + b_j + \frac{\|R_{NOC} - R_j\|}{c} + \delta t_{prop} + v$$

where $T_{TOA}$ is the time at which the "time-mark" is received by (arrives at) the NOC receiver; $T_{TOT}$ is the time at which the "time-mark" was transmitted by a source j with unknown source clock bias $b_j$; $R_{NOC}$ is the known location of the NOC; $R_j$ is the known location of the j-th source as predicted using known data or satellite ephemeris; $\delta t_{prop}$ is the propagation delay due to ionosphere and troposphere delays; c is the speed of light; and v is receiver noise.

With the above equation, one can derive a clock bias estimate $b_j$ by simply averaging many measurements over time using the following equation:

$$b_j = \text{average}\left(T_{TOA} - T_{TOT} - \frac{\|R_{NOC} - R_j\|}{c} - \hat{\delta t}_{prop}\right)$$

where $\hat{\delta t}_{prop}$ is a prediction of the propagation delay derived from models or other information sources.

It is also possible to use a fixed-gain estimator or a Kalman filter to estimate not only the relative clock bias but also clock rate bias and other clock error parameters. The results can be broadcasted to the user. The results may be used to correct the TOA measurements by the user equipment to effectively synchronize all TOA measurements from all sources to allow GNSS-like positioning solutions provided by the user equipment.

Figure 7:
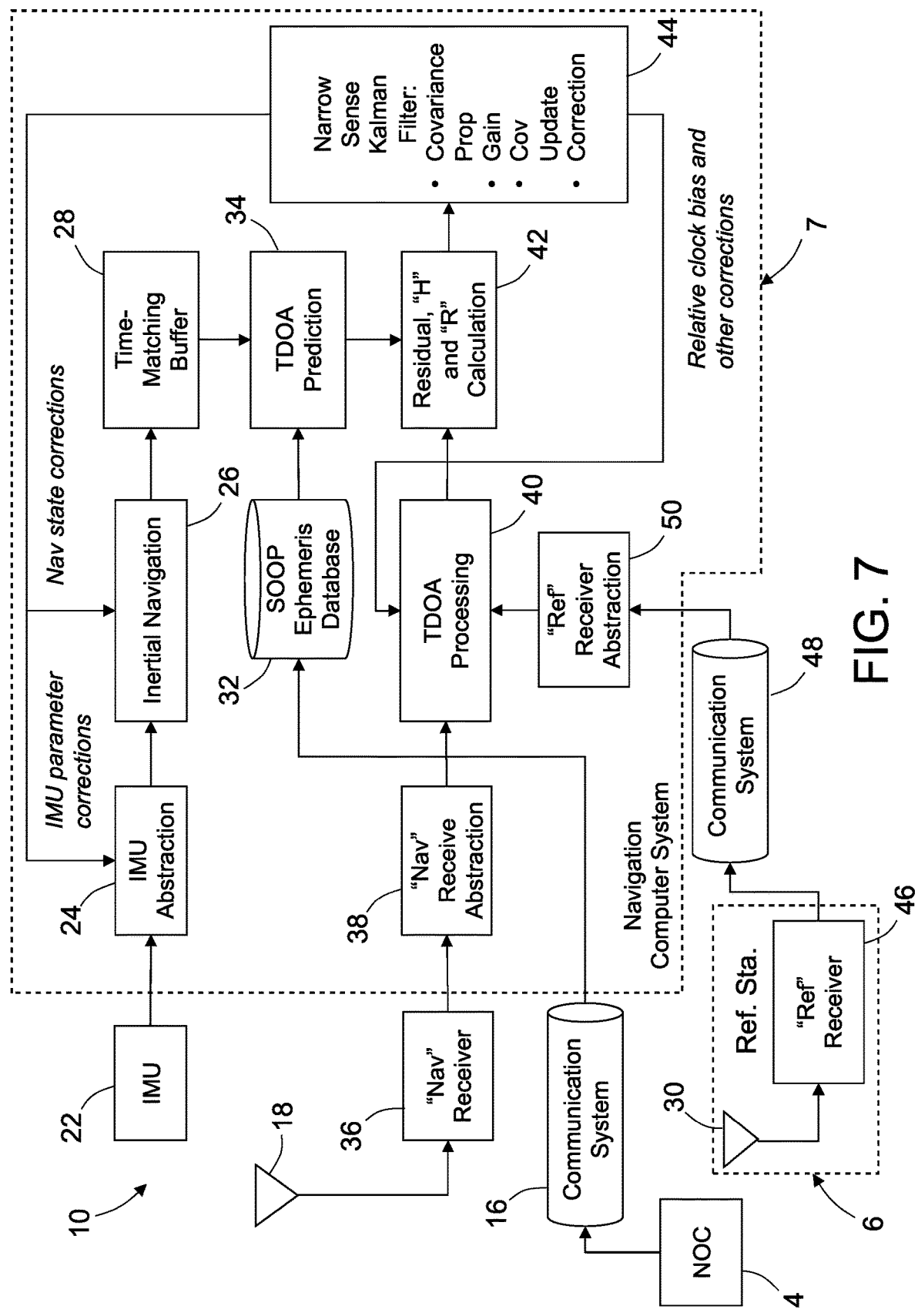
FIG. 7 is a diagram identifying components of a navigation system in which mobile user equipment uses SOOP-based navigation to augment inertial navigation in accordance with an exemplary embodiment that depends on information from a network operations center and information from a reference station.

FIG. 7 is a diagram identifying components of a navigation system 20 in which the user equipment 10 uses SOOP-based navigation to augment inertial navigation in accordance with an exemplary embodiment that depends on information from NOC 4 and information from a reference station 6. The NOC 4 sends data to the navigation computer system 7 of user equipment 10 via a communication system 16. The reference station 6 sends data to navigation computer system 7 via a communication system 48. Each of NOC 4, reference station 6, and user equipment 10 receive SOOP from signal sources (not shown in FIG. 2) within detection range.

The user equipment 10 includes IMU 22, antenna 18, navigation receiver 36 which receives signals from antenna 18, and navigation computer system 7. The navigation receiver 36 may have the structure and functionality previously described with reference to either FIG. 3 or FIG. 4. The reference station 6 includes antenna 30 and reference receiver 46 which receives signals from antenna 30. The navigation computer system 7 receives data from IMU 22, navigation receiver 36a, and communication systems 16 and 48 (see FIG. 7) and then processes that data to determine the position of user equipment 10 in an Earth-centered frame of reference.

In the example depicted in FIG. 7, the navigation computer system 7 includes IMU abstraction module 24 connected to IMU 22 and an inertial navigation module 26 connected to IMU abstraction module 24. The inertial navigation module 26 implements the inertial navigation by integrating the IMU output using standard strap-down inertial navigation equations. The navigation computer system 7 also includes a time-matching buffer 28 which is connected to receive the propagation solution from the inertial navigation module 26 and store a short history of the navigation states, including the attitude, velocity, position and possibly other relevant variables. The delayed propagation solution is output from time-matching buffer 28 to TDOA prediction module 34.

The NOC 4 depicted in FIG. 7 has the capability to receive or collect or produce data that can be used to determine the position or ephemeris of the SOOP sources. For example, the NOC 4 may receive location/ephemeris data (e.g., a satellite orbit determination solution) provided by a third party. The NOC 4 may receive location data for ground-based signal sources such as television stations, radio stations, or cell phone towers. Optionally, the NOC 4 may be configured to collect its own measurements and perform the orbit determination itself. The source location/ephemeris information for the SOOP sources is sent to and stored in the SOOP source ephemeris database 32 through communication system 16.

As previously described, the TDOA prediction module 34 retrieves source location/ephemeris information and inter-source clock biases for the SOOP sources from the SOOP source ephemeris database 32 (which information is periodically updated by the NOC 4). The TDOA prediction module 34 is configured to predict the TDOA measurement. The predicted TDOA is for the instant in time the measured TDOA is valid for.

More specifically, the TDOA prediction module 34 knows the following: (1) the location of the SOOP source (which is known or computed based on SOOP source location/ephemeris data stored in the SOOP ephemeris database 32); (2) the location of the reference station 6 (which is either known a priori or is sent to the user equipment 10 by the reference station 6); (3) the current estimate of the location of the user equipment (which is retrieved from the time-matching buffer 28); and (4) the estimated inter-source clock biases between the SOOP sources (generated by the NOC 4). Using the foregoing information, the TDOA prediction module 34 estimates or predicts the differences between the respective times of arrival of the SOOP signal at the navigation receiver 36 and at the reference receiver 46. This process is repeated for multiple SOOP sources.

The TDOA processing module 40 is configured to generate TDOA data based on the TOA data received from navigation receiver 36 and reference receiver 46 and further based on a current estimate of the relative clock bias between the navigation and reference receivers calculated by the Kalman filter 44. In accordance with an alternative embodiment, instead of the measured TDOA being corrected to take into account the relative clock bias, the TDOA prediction module 34 may be configured to take into account the estimated relative clock bias. Either way works and they are mathematically equivalent.

The remaining components of navigation computer system 7 depicted in FIG. 7 are the same as like-numbered components depicted in FIG. 2 and have the same functionalities. The residual and sensitivity-matrix calculation module 42 compares the predicated TDOA data from TDOA prediction module 34 against the measured TDOA data from TDOA processing module 40 to calculate a Kalman filter residual r. The Kalman filter 44 calculates IMU parameter corrections, navigation state corrections, and the relative clock bias between the reference receiver 46 and the navigation receiver 36 (and other corrections).

Figure 8:
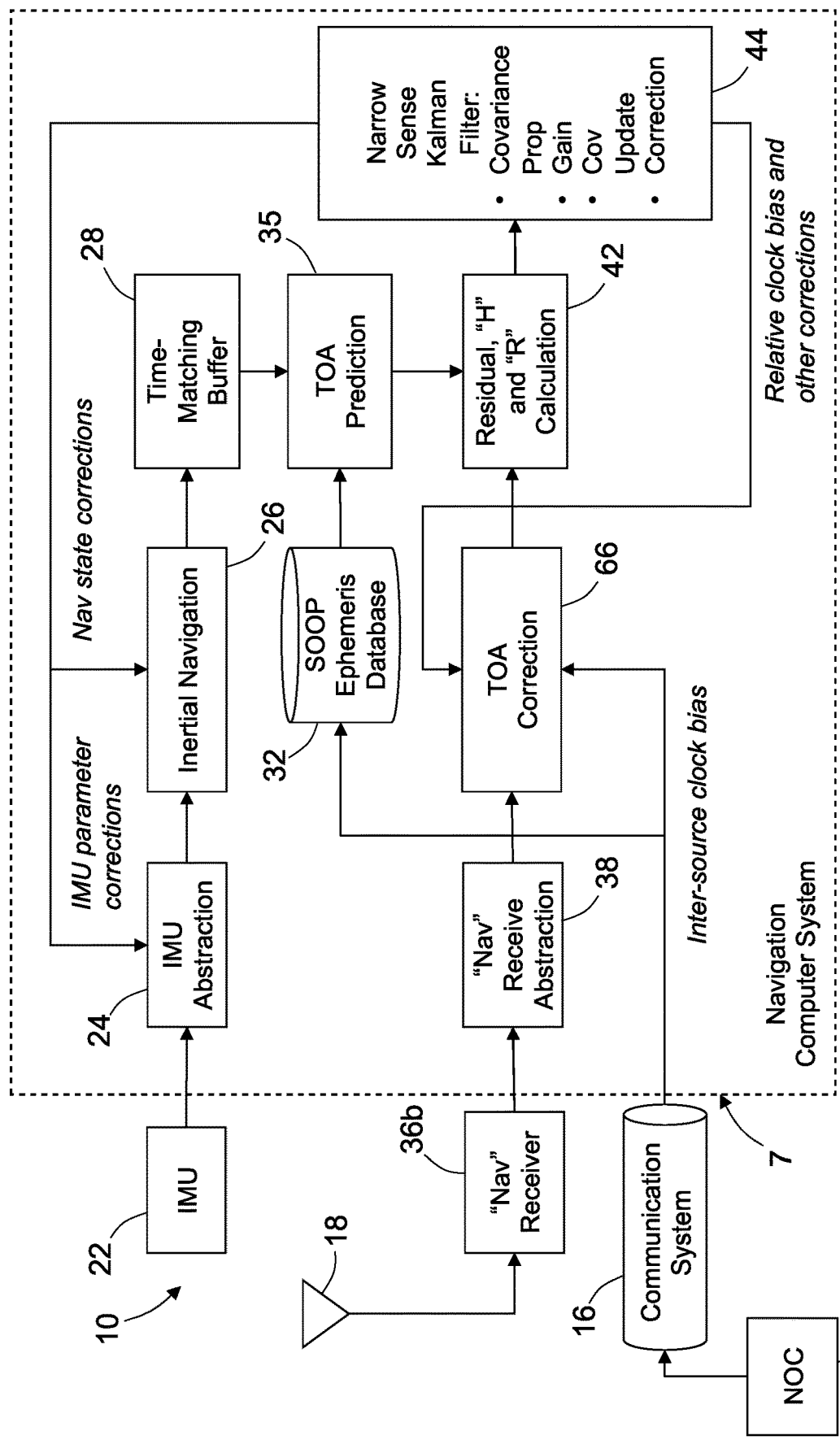
FIG. 8 is a diagram identifying components of a navigation system in which mobile user equipment uses SOOP-based navigation to augment inertial navigation in accordance with an exemplary embodiment that depends on information from a network operations center.

FIG. 8 is a diagram identifying components of a navigation system 20 in which the user equipment 10 uses SOOP-based navigation to augment inertial navigation in accordance with an exemplary embodiment that depends on information from NOC 4 and does not depend on information from a reference station. The structure and function of the inertial navigation (propagation) channel (including IMU 22 and inertial navigation module 26) are the same as previously described with reference to FIG. 2. The NOC 4 and navigation receiver 36b have the respective structures and respective functionalities previously described with reference to FIG. 6.

More specifically, NOC 4 uploads source location/ephemeris information and inter-source clock biases for the SOOP sources to the SOOP source ephemeris database 32. The NOC 4 is able to receive or collect or produce data that can be used to determine relative clock biases between different groups of signal sources. For example, NOC 4 is configured to estimate the relative clock bias between two systems of synchronized SOOP sources (e.g., the Iridium, Global Star, and Sirius XM satellite systems). The NOC 4 is also configured to monitor the health, availability, and integrity of the signal sources. The NOC 4 broadcasts the signal source information to all users within range.

Still referring to FIG. 8, the time-matched position, velocity and attitude of the user equipment 10 (stored in the time-matching buffer 28) constitute the delayed propagation solution. The delayed propagation solution is output to a TOA prediction module 35. The TOA prediction module 35 predicts the TOA measurement using the SOOP source location (known or computed from the source location/ephemeris information), the current estimate of the user equipment position (retrieved from the time-matching buffer 28), and the inter-source clock biases. The predicted TOA is for the instant in time the measured TOA is valid for.

The navigation system 20 depicted in FIG. 8 further includes a TOA correction module 66 which receives the inter-source clock bias information from NOC 4. The TOA correction module 66 includes the difference calculation module 64 previously described with reference to FIG. 4. The TOA correction module 66 is configured to generate a corrected TOA measurement. The TOA are corrected by the inter-source clock bias received from NOC 4.

The residual and sensitivity-matrix calculation module 42 compares the predicated TOA data against the measured TOA data to calculate a Kalman filter residual r. In this case, the residual r represents the difference between the predicted TOA and the measured TOA. The Kalman filter 44 implements the known art of Kalman filter equations and calculates IMU parameter corrections, navigation state corrections, and the relative clock bias and other corrections.

In an alternative embodiment, the navigation computer system 7 may be configured to operate in either of two modes: (a) When no reference station is used, the inter-source clock bias estimate from NOC 4 is used to correct the TOAs, which corrected TOAs are then used by navigation computer system 7 to perform PNT; or (2) when a reference station is used, the navigation computer system 7 uses TDOA to perform PNT. In this embodiment, the navigation computer system 7 would include both a TDOA processing module 40 and a TOA correction module 66, which operate in the ways previously described with reference to FIGS. 7 and 8, respectively.

As depicted in FIGS. 7 and 8, the user equipment 10 is typically an integration of a SOOP receiver and an inertial navigation system which integrates the IMU output of delta angle (or rotational rates) and delta velocity (or acceleration) into attitude, velocity, and position of user equipment 10. In the alternative, when an IMU is not available, the inertial navigation system can be replaced by a kinematics- or dynamics-based propagation model. The navigation computer system 7 may be configured to generate a model-based estimated position using the kinematics- or dynamics-based propagation model (instead of using position estimated using an inertial navigation system) and then use the SOOP-derived estimated position to correct the model-based estimated position.

As a typical example, the kinematic motion of a vehicle may be modeled using the following 9-state differential equation:

$$\frac{d}{dt}\begin{bmatrix} R \\ V \\ A \end{bmatrix} = \begin{bmatrix} 0 & I & 0 \\ 0 & 0 & I \\ 0 & 0 & 0 \end{bmatrix}\begin{bmatrix} R \\ V \\ p \end{bmatrix} + \begin{bmatrix} 0 \\ 0 \\ f \end{bmatrix} + \begin{bmatrix} 0 \\ 0 \\ w \end{bmatrix}$$

where f is a best "guess" of the acceleration A of the vehicle and w is a white noise process that models the uncertainty of the acceleration model. Simply integrating the above equation creates a navigation system which is equivalent to an inertial navigation system (typically with much worse performance). The rest of the architecture stays the same.

Figure 9:
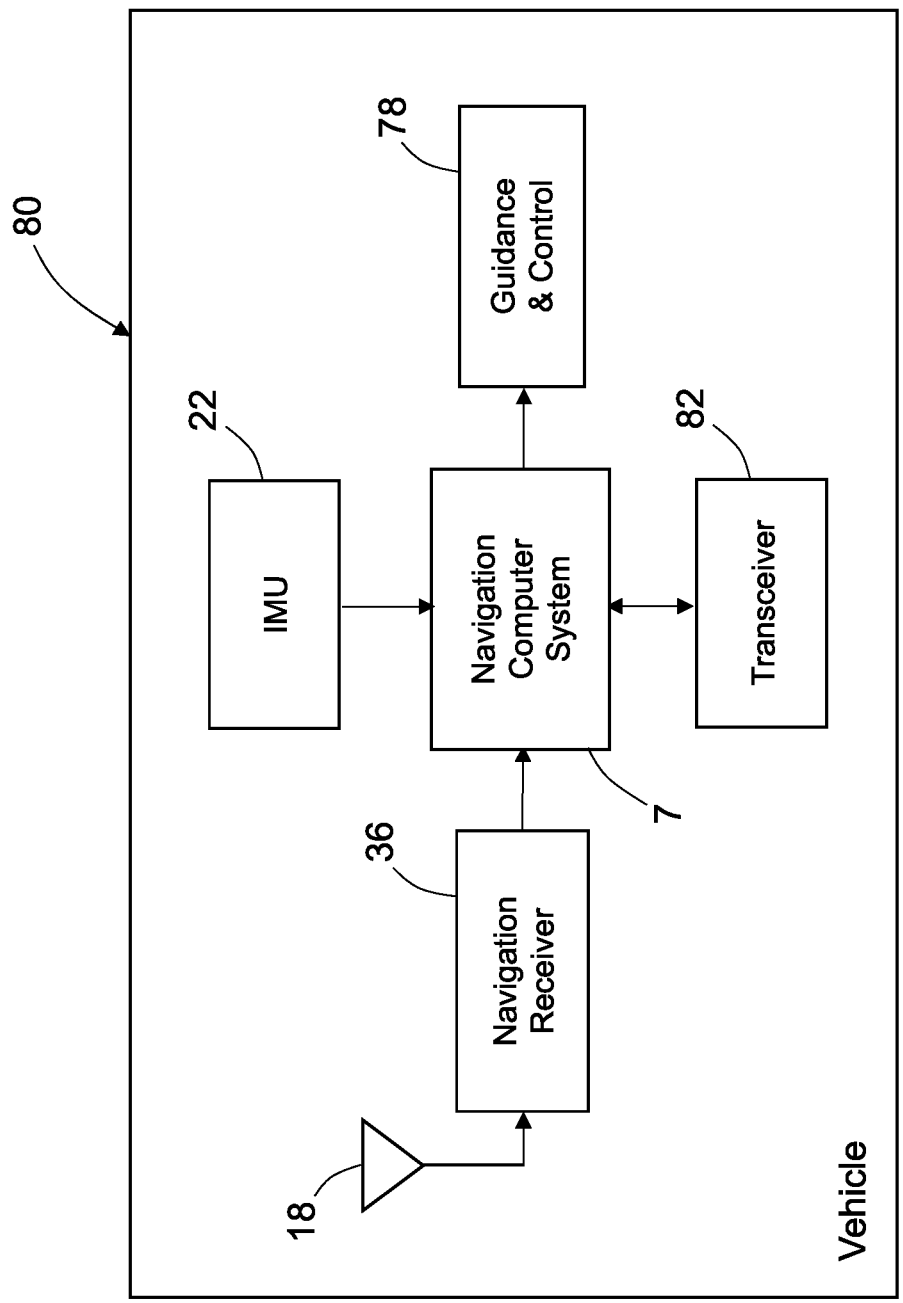
FIG. 9 is a block diagram identifying components of a vehicle equipped with user equipment of the type depicted in FIG. 7.

FIG. 9 is a block diagram identifying components of a vehicle 80 equipped with user equipment 10 of the type depicted in FIG. 7. The user equipment 10 includes an antenna 18, a navigation receiver 36 connected to the antenna 18, an IMU 22, and a navigation computer system 7 that receives IMU data from IMU 22 and SOOP data from the navigation receiver 36. The user equipment 10 also includes one or more transceivers 82 which are configured to receive wireless communications from a network operations center and a reference station (neither of which are shown in FIG. 9). In accordance with the embodiment depicted in FIG. 9, the user equipment 10 further includes a guidance and control system 78 (e.g., a flight controller or autopilot in the case where the vehicle is an aircraft). The navigation solution generated by navigation computer system 7 is used by the guidance and control system 78 to control movement of the vehicle 80.

FIG. 10 is a block diagram identifying major systems of an NOC 4 in accordance with one embodiment. The components of the NOC 4 include the following: (1) an antenna 68; (2) one or more NOC receivers 70 configured to receive the SOOP signals; (3) a communication and data collection module 72 configured to receive data from different sources;

(4) a computer system 74 (e.g., a computer and software) configured (e.g., programmed) to determine the ephemeris of moving signal sources and relative (inter-source) clock biases and process heath/availability and integrity information; and (5) a communication device 76 (e.g., a transmitter or transceiver) that is capable of broadcasting information to users.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While SOOP-based PNT system have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor or controller, such as a general-purpose central processing unit, a microcontroller, a reduced instruction set computer processor, an application-specific integrated circuit, a programmable logic circuit, a field-programmable gate array, a digital signal processor, and/or any other data processing circuitry capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A system for navigation using signals of opportunity (SOOP), the system comprising a network operations center and user equipment which are capable of communicating with each other, wherein:
   the network operations center is configured to estimate an inter-source clock bias between a first group of SOOP sources which are synchronized and a second group of SOOP sources which are synchronized, and comprises an antenna, a network operations center receiver (NOC receiver) connected and configured to generate SOOP data derived from SOOP transmitted by SOOP sources of the first and second groups and detected by the antenna of the network operations center, a computer system configured to generate SOOP source location/ephemeris data and inter-source clock bias data based on the SOOP data generated by the NOC receiver, and a communication device that is capable of broadcasting the SOOP source location/ephemeris data and inter-source clock bias data to the user equipment; and
   the user equipment comprises an antenna, a navigation receiver connected and configured to generate SOOP data derived from SOOP transmitted by SOOP sources of the first and second groups and detected by the antenna of the user equipment, and a navigation computer system configured to calculate a navigation solution, including a SOOP-derived estimated position of the user equipment, based on the SOOP source location/ephemeris data and inter-source clock bias data broadcasted by the network operations center and the SOOP data generated by the navigation receiver.

2. The system as recited in claim 1, wherein the SOOP data generated by the NOC receiver comprises times of arrival of SOOP from SOOP sources.

3. The system as recited in claim 1, wherein the computer system of the network operations center is further configured to process SOOP source location/ephemeris data received from third parties.

4. The system as recited in claim 1, wherein the computer system of the network operations center is further configured to estimate and model ionosphere and troposphere delays.

5. The system as recited in claim 1, wherein:
   the user equipment further comprises an inertial measurement unit configured to generate acceleration data and rotational rate data representing a measured acceleration and the rotational rate of the user equipment; and
   the navigation solution calculated by the navigation computer system is also based on the acceleration data and rotational rate generated by the inertial measurement unit updated by times of arrival corrected by inter-source clock biases.

6. The system as recited in claim 1, wherein the navigation computer system is further configured to generate a model-based estimated position using a kinematics- or dynamics-based propagation model and then use the SOOP-derived estimated position to correct the model-based estimated position.

7. The system as recited in claim 1, wherein the SOOP data generated by the navigation receiver comprises times of arrival, the inter-source clock bias data comprises inter-source clock bias estimates, and the navigation computer system comprises a time-of-arrival correction module which is configured to correct the times of arrival using the inter-source clock bias estimates.

8. A method for operating user equipment to navigate using signals of opportunity (SOOP) transmitted by a first group of SOOP sources which are synchronized and a second group of SOOP sources which are synchronized and using an inter-source clock bias between the first and second groups of SOOP sources estimated by a network operations center, the method comprising:
   (a) receiving location/ephemeris data and inter-source clock bias data for SOOP sources broadcasted by the network operations center;
   (b) receiving SOOP from SOOP sources at a navigation receiver of the user equipment;
   (c) converting the SOOP into SOOP data; and
   (d) calculating a navigation solution, including a SOOP-derived estimated position of the user equipment, based on the SOOP source location/ephemeris data and inter-source clock bias data broadcasted by the network operations center and the SOOP data.

9. The method as recited in claim 8, further comprising generating acceleration data and rotational rate data representing a measured acceleration and rotational rate of the user equipment, wherein the navigation solution calculated in step (d) is also based on the acceleration data and rotational rate data.

10. The method as recited in claim 8, further comprising generating a model-based estimated position using a kinematics- or dynamics-based propagation model and then using the SOOP-derived estimated position to correct the model-based estimated position.

11. The method as recited in claim 8, wherein the SOOP data comprises times of arrival of SOOP from the SOOP sources and the inter-source clock bias data comprises inter-source clock bias estimates, the method further comprising correcting the times of arrival using the inter-source clock bias estimates.

12. The method as recited in claim 8, wherein the network operations center broadcasts location/ephemeris data determined by a third party.

13. The method as recited in claim 8, wherein the network operations center estimates and models ionosphere and troposphere delays.

14. The method as recited in claim 8, wherein the user equipment is carried onboard a vehicle, the method further comprising controlling the vehicle in accordance with the updated navigation solution.

15. A system for navigation using signals of opportunity (SOOP), the system comprising:
a network operations center configured to generate SOOP source location/ephemeris data;
a reference receiver configured to generate SOOP data derived from SOOP received at the reference receiver; and
user equipment configured to receive and process data received from the network operations center and data received from the reference receiver, wherein the user equipment comprises:
a navigation receiver configured to receive a signal of opportunity and generate SOOP data derived from the signal of opportunity; and
a navigation computer system configured to calculate a navigation solution, including an estimated position of the user equipment, based on at least signals of opportunity transmitted by SOOP sources and received by the navigation and reference receivers and SOOP source location/ephemeris data transmitted by the network operations center, and
wherein the network operations center comprises a computer system which is configured to generate or update current SOOP source location/ephemeris data based on crowd sourcing data from users in an environment where GPS or GNSS is available, using time of arrival (TOA) data received from each of a plurality of users to calculate a source position vector.

16. The system as recited in claim 15, wherein:
the user equipment further comprises an inertial measurement unit configured to generate acceleration data and rotational rate data representing a measured acceleration and the rotational rate of the user equipment; and
the navigation solution calculated by the navigation computer system is also based on the acceleration data and rotational rate generated by the inertial measurement unit updated by times of arrival corrected by inter-source clock biases.

17. The system as recited in claim 16, wherein the system is a vehicle, further comprising a guidance and control system communicatively coupled to the inertial navigation system and configured to control the vehicle in accordance with the updated navigation solution.

18. The system as recited in claim 15, wherein the navigation computer system is further configured to generate a model-based estimated position using a kinematics- or dynamics-based propagation model and then use the SOOP-derived estimated position to correct the model-based estimated position.

19. The system as recited in claim 15, wherein the SOOP data is in-phase and quadrature (I/Q) data and the navigation computer system comprises a cross-correlator configured to correlate I/Q data received from the navigation receiver with I/Q data received from the reference receiver, to generate measured time difference of arrival (TDOA).

20. The system as recited in claim 15, wherein the SOOP data is time of arrival (TOA) data and the navigation computer system comprises a difference calculation module configured to calculate the measured time difference of arrival (TDOA) based on a difference between a first TOA of a signal of opportunity at the navigation receiver and a second TOA of the signal of opportunity at the reference receiver.

21. The system as recited in claim 15, wherein the source position vector is calculated using the equation:

$$T_{TOA,k} = T_{TOT} + b_j + \|R_k - R_j\|/c + \delta t_{prop} + v$$

where $T_{TOA,k}$ is the time at which the "time-mark" is received by the SOOP receiver of the k-th user; $T_{TOT}$ is the time at which the "time-mark" was transmitted by a source j (hereinafter "j-th source") with unknown source clock bias $b_j$; $R_k$ is the known location of the k-th user; $R_j$ is the known location of the j-th source as predicted using known data or satellite ephemeris; $\delta t_{prop}$ is the propagation delay due to ionosphere and troposphere delays; c is the speed of light; and v is receiver noise.

22. A network operations center configured to estimate an inter-source clock bias between a first group of SOOP sources which are synchronized and a second group of SOOP sources which are synchronized, comprising an antenna, a network operations center receiver (NOC receiver) connected and configured to generate SOOP data derived from SOOP transmitted by SOOP sources of the first and second groups and detected by the antenna, a computer system configured to generate SOOP source location/ephemeris data and inter-source clock bias data based on the SOOP data generated by the NOC receiver, and a communication device that is capable of broadcasting the SOOP source location/ephemeris data and inter-source clock bias data.

23. The network operations center as recited in claim 22, wherein the computer system is further configured to process SOOP source location/ephemeris data received from third parties.

24. The network operations center as recited in claim 22, wherein the computer system is further configured to estimate and model ionosphere and troposphere delays.

* * * * *